Patented Feb. 7, 1950

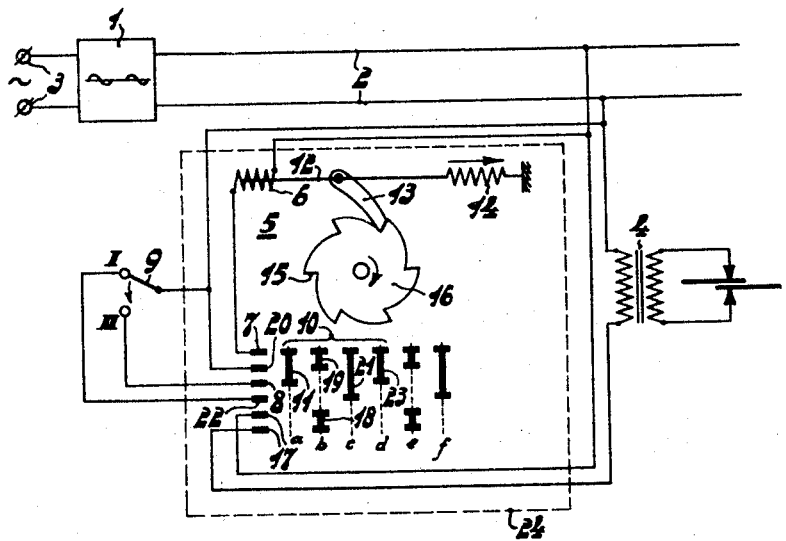

2,496,779

UNITED STATES PATENT OFFICE 2,496,779

WELDING APPARATUS AND CONTROL THEREFOR ACTUATED BY AN ELECTRIC CURRENT PULSE TIMER

Frans Hendrik de Jong, Eindhoven, Netherlands, assignor to Hartford National Bank and Trust Company, Hartford, Conn., as trustee Application August 13, 1948, Serial No. 44,025
In the Netherlands September 29, 1947

6 Claims. (Cl. 175—320)

This invention relates to devices comprising an electric current pulse timer apparatus which supplies a series of electric current pulses alternating with time intervals of no current for the common electric energy feeding of a number of welding apparatus to be connected thereto. More particularly the device of the present invention is related to those in use with a plurality of spot-welding apparatus, each of which is switched on when no current flows by means of separate relays comprising several contacts through a control switch associated therewith. Such a device is shown in British patent specification 582,225. Therein the device operates with three relays; a main relay to switch the welding circuit into or out of circuit, a switching-on relay to close the energizing circuit of the main relay, and a switching-off relay to break the supply circuit of the switching-on relay and thus of the main relay. For universal use all the relays must be fed with special supply voltages in order to be capable of working at the correct instant and, in addition, with a special retaining voltage. The relays must furthermore operate with a predetermined retardation. The switching operation of the aforesaid device furthermore varies to a high extent with relation to the duration of a series of pulses controlled by the electric current pulse timer apparatus, i. e. it may be shorter than half a cycle, longer than half a cycle but shorter than a whole cycle and longer than a whole cycle. In addition to the disadvantage of the use of three relays with different supply voltages, the need for a determined retardation, and a circuit that varies with the pulse duration, all as set forth hereinbefore, the circuit-arrangement of this device is very complicated.

According to the present invention, an electrical control relay is characterized in that each welding apparatus comprises only one relay, the energizing coil of which is adapted to be connected, through contacts controlled by the relay and with the use of the associated control-switch, to the common supply for the welding apparatus. Furthermore, the arrangement is such that the control-switch being switched on, the connecting contacts of the welding apparatus associated with the relay are connected by the relay under the action of a first pulse series, during the subsequent time interval of no current, to the common supply, Additionally, when the next following pulse series is fed both to the welding apparatus and to the energizing coil, the relay contacts are changed-over during the time interval following the second series of pulses.

The circuit arrangement of such a device has the following advantages: it is extremely simple, independent of the number of pulses per series (which number may thus be adjusted at will by the electric current pulse timer apparatus) and requires a smaller number of supply leads and only a single supply voltage.

The circuit-arrangement of this device provides various possibilities, which will be explained more fully in the description of the figure.

According to a further characteristic of the invention, the relay is so designed that the connection of the contacts of the welding apparatus to the common supply is interrupted by the relay, which is adapted to be energized by one of the pulse series following the first series of pulses, during the subsequent time interval of no current. It is thus possible that the welding apparatus remains connected to the supply mains during the third and, as the case may be, also during the fourth or fifth series of pulses and is switched off not until then by the relay.

The invention will now be described more fully with reference to the accompanying drawing, which diagrammatically shows, by way of example, one embodiment thereof.

In the device shown in the figure, an electric current pulse timer 1 apparatus for seam welding, which supplies series of pulses alternating with time-intervals to the common supply mains 2, is connected to an alternating voltage source 3. To the supply mains 2 are connected a number of welding apparatus, of which one, designated by 4, is shown in the drawing. Each of the welding apparatus 4, which may be switched on separately without current through a separate relay, comprises a plurality of contacts with the use of an associated control switch, and only one relay 5. The energizing coil 6 of the relay 5 may be connected through contacts 7 and 8 to the common supply main 2, and is in turn controlled by the relay. This last is accomplished by means of the associated control switch 9, if switched into position II, since a contact strip 11, which is provided on a rotatable controller drum 10

(shown diagrammatically) contacts in position *a* with the stationary contacts 7 and 8. Switching on of the control switch 9, as for example by foot-operated means, may be effected at any desired moment.

The control switch 9 being switched on, the relay coil 6 is energized by the first incoming series of pulses with the result that an armature 12 and a pawl 13 connected thereto are drawn to the left against the force of a spring 14 until the pawl falls behind a tooth 15 of a ratchet wheel 16. At the end of the first series of pulses, the spring 14 draws the ratchet wheel 16 during the subsequent time interval of no current, via the tooth 15, to the right, so that the controller drum 10, which is coupled with the ratchet wheel 16, is turned in such manner that the contacts 19 and 18 located in the line *b* engage the stationary contacts 7, 20 and 17, 17, respectively.

After the control switch 9 is initially switched on, the connecting contacts 17 of the welding apparatus 4 associated with the relay are thus connected by the relay under the action of the first series of pulses, during the subsequent time interval of no current, to the common supply 2, through a contact strip 18 provided on the switching roller 10.

The subsequent second series of pulses is fed to both the welding apparatus and the energizing coil 6, the latter through a contact strip 19 provided on the switching roller 10 and through the stationary contacts 7 and 20.

During this second series of pulses the welding operation is performed and at the same time the armature 12 and the pawl 13 therewith are drawn to the left as seen in the figure, so that relay contacts on the switching roller 10 are changed over by the spring 14, during the time interval of no current following the second series of pulses, into position *c*. As regards this last change over operation, a choice of results may be made from among various possibilities, which will now be described hereinafter.

Thus, for example, in position *c* there may be provided contacts which are identical with those in position *b*, so that simply a repetition follows. In such case the welding operation is performed and the armature 12 is drawn to the left during the third series of pulses and the controller drum 10 is turned into position *d* during the subsequent time interval of no current. In this position also a repetition may follow, so that three successive series of pulses are supplied to the work-piece provided in the welding apparatus 4.

In the above case, it is not necessary to use a contact strip, such as the strip 19, since, when the control-switch 9 is invariably switched on in position II, it is, as an alternative, possible to use a contact strip as designated 11. In this case also the relay will be energized and furthermore the contact 20 could be dispensed with.

In the aforesaid cases the relay is, consequently, so designed that the connection of the contacts of the welding apparatus to the common supply will be interrupted by the relay at a certain moment, i. e. during the time interval of no current which follows one of the pulse series succeeding the first series of pulses, by which the relay is energized.

Assuming that the work-piece requires only one sequence of pulses (the second sequence of pulses thus being supplied to the welding apparatus through the strip 18), there is, consequently, in position *c* no contact to bridge the contacts 17. However, provision is made of a contact strip 21, which is included in the circuit of the energizing coil 6 in such manner that after the second sequence of pulses, the control switch 9 being still switched on in position II, the energizing circuit is interrupted, through a strip 21 and a contact 22, during the following sequence of pulses, for example the third (or the fourth, or the fifth sequence of pulses when the welding contact 18 has been repeated once or twice on the drum 10) whereas, the control switch 9 being switched off in position I through a second contact thereof, the energizing coil 6 is connected, through 7, 21, 22 and I, to the common supply 2, so that after switching off the control switch 9 in position I, the coil 6 is energized by the subsequent sequence of pulses and, for example, the initial connection of the energizing coil 6 and the welding apparatus is restored for the next welding operation during the subsequent interval. For this purpose the drum may be provided in the positions *d*, *e* and *f* with contact strips corresponding with those of the positions *a*, *b* and *c*.

After the control switch 9 has been switched off in position I, the controller drum 10 is moved from position *c* into position *d* owing to the energization of the relay through contact strip 21, during the interval following the third sequence of pulses, so that the initial condition is restored. As long as the control switch is maintained in the off-position I, the relay is not energized, since the current circuit constituted by the coil 6, contact 7, contact strip 23 and contact 8 is interrupted at II.

Then a new work-piece may be inserted, whereupon the cycle is repeated by switching the control switch into position II.

The device described may be adapted, in a simple manner, to other requirements by varying the contact pieces, or by inserting a new switch roller 10.

The parts located within the dotted line 24 may be housed in a suitable casing. The control switch 9 may be a manual switch or a foot-operated switch. The device may be combined with the welding machine to form a unit. Each welding apparatus 4, comprising such a device, only requires two leads for connection to the supply means.

What I claim is:

1. An electrical control relay comprising an energizing coil having one end connected to a first stationary contact and the other end thereof adapted to be connected to one main of an electric current source, a second stationary contact adapted to be connected into the other main of the electric current source, a third and a fourth contact, means including a switch for selectively electrically connecting either of said third and fourth stationary contacts to a conductor adapted to be connected to the other main, a fifth stationary contact adapted to be connected to the one main, a sixth stationary contact adapted to be connected to the apparatus to be controlled, armature means operatively associated with said coil, movable contact selector means operatively associated with said six stationary contacts, and means actuatable upon deenergization of said coil subsequent to an energization thereof for moving said contact selector means stepwise past said stationary contacts.

2. In combination; electric current pulse timer means for supply sequences of current pulses alternating with time intervals of no current, a welding apparatus, a pair of supply mains electrically connecting said welding apparatus to said timer means, and a single relay electrically connected in one of said mains between said welding apparatus and said timer means, said relay comprising; an energizing coil connected at opposite ends thereof to said one of said mains and to a first stationary contact, a second stationary contact connected into the other of said supply mains, a third and a fourth stationary contact, means including a switch for selectively electrically connecting either of said third and fourth stationary contacts to said other supply main, a fifth stationary contact connected to said one supply main, a sixth stationary contact connected into said welding apparatus and adapted for completing a circuit through said welding apparatus, armature means operatively associated with said coil, movable contact selector means operatively associated with said six stationary contacts, and means actuatable upon deenergization of said coil subsequent to an energization thereof for moving said contact selector means stepwise past said stationary contacts.

3. In combination; electric current pulse timer means for supplying sequences of current pulses alternating with time intervals of no current, a welding apparatus, a pair of supply mains electrically connecting said welding apparatus to said timer means, and a single relay electrically connected in one of said mains between said welding apparatus and said timer means, said relay comprising; an energizing coil connected at opposite ends thereof to said one of said mains and to a first stationary contact, a second stationary contact connected into the other of said supply mains, a third and a fourth stationary contact, means including a switch for selectively electrically connecting either of said third and fourth stationary contacts to said other supply main, a fifth stationary contact connected to said one supply main, a sixth stationary contact connected into said welding apparatus and adapted for completing a circuit through said welding apparatus, armature means operatively associated with said coil, movable contact selector means operatively associated with said sixth stationary contacts, and means actuatable upon deenergization of said coil subsequent to an energization thereof for moving said contact selector means stepwise past said stationary contacts, said movable contact selector means comprising a first contact bridge constructed and arranged for bridging said first stationary contact and said third stationary contact when moved into alignment therewith, and a second pair of contact bridges constructed and arranged for bridging said first and second stationary contacts and said fifth and sixth stationary contacts, respectively, when moved into alignment therewith.

4. In combination; electric current pulse timer means for supplying sequences of current pulses alternating with time intervals of no current, a welding apparatus, a pair of supply mains electrically connecting said welding apparatus to said timer means, and a single relay electrically connected in one of said mains between said welding apparatus and said timer means, said relay comprising; an energizing coil connected at opposite ends thereof to said one of said mains and to a first stationary contact, a second stationary contact connected into the other of said supply mains, a third and a fourth stationary contact, means including a switch for selectively electrically connecting either of said third and fourth stationary contacts to said other supply main, a fifth stationary contact connected to said one supply main, a sixth stationary contact connected into said welding apparatus and adapted for completing a circuit through said welding apparatus, armature means operatively associated with said coil, movable contact selector means operatively associated with said six stationary contacts, and means actuatable upon deenergization of said coil subsequent to an energization thereof for moving said contact selector means stepwise past said stationary contacts, said movable contact selector means comprising a first contact bridge constructed and arranged for bridging said first stationary contact and said third stationary contact when moved into alignment therewith, and a second pair of contact bridges constructed and arranged for bridging said first and second stationary contacts and said fifth and sixth stationary contacts, respectively, when moved into alignment therewith, and a third contact bridge constructed and arranged for bridging said first and fourth stationary contacts when moved into alignment therewith.

5. In combination; electric current pulse timer means for supplying sequences of current pulses alternating with time intervals of no current, a welding apparatus, a pair of supply mains electrically connecting said welding apparatus to said timer means, and a single relay electrically connected in one of said mains between said welding apparatus and said timer means, said relay comprising; an energizing coil connected at opposite ends thereof to said one of said mains and to a first stationary contact, a second stationary contact connected into the other of said supply mains, a third and a fourth stationary contact, means including a switch for selectively electrically connecting either of said third and fourth stationary contacts to said other supply main, a fifth stationary contact connected to said one supply main, a sixth stationary contact connected into said welding apparatus and adapted for completing a circuit through said welding apparatus, armature means operatively associated with said coil, means operative upon deenergization of said coil for retracting said armature means from the position thereof assumed with respect to said coil when said coil is energized, movable contact selector means operatively associated with said six stationary contacts, and means actuatable upon retraction of said armature means for moving said contact selector means stepwise past said stationary contacts.

6. In combination; electric current pulse timer means for supplying sequences of current pulses alternating with time intervals of no current, a welding apparatus, a pair of supply mains electrically connecting said welding apparatus to said timer means, and a single relay electrically connected in one of said mains between said welding apparatus and said timer means, said relay comprising; an energizing coil connected at opposite ends thereof to said one of said mains and to a first stationary contact, a second stationary contact connected into the other of said supply mains, a third and a fourth stationary contact, means including a switch for selectively electrically connecting either of said third and fourth stationary contacts to said other supply main, a fifth stationary contact connected to said one supply main, a sixth stationary contact connected into said welding apparatus and adapted for completing a circuit through said welding apparatus, armature means operatively associated with said coil, means operative upon deenergization of said coil for retracting said armature means from the position thereof assumed with respect to said coil when said coil is energized, movable contact selector means operatively associated with said six stationary contacts, and means actuatable upon retraction of said armature means for moving said contact selector means stepwise past said stationary contacts, said actuatable means comprising a ratchet wheel, said armature means including a pawl part in operative relationship with said ratchet wheel, said movable contact selector means comprising a rotatable drum coupled to said ratchet wheel, said first, second and third contact bridges being mounted on said drum.

FRANS HENDRIK DE JONG.

REFERENCES CITED

The following references are of record in the file of this patent:

UNITED STATES PATENTS

| Number | Name | Date |
|---|---|---|
| 1,769,060 | Hendry | July 1, 1930 |
| 1,809,020 | Burdick | June 9, 1931 |
| 2,366,984 | Scheg | Jan. 9, 1945 |